Sept. 15, 1964     C. H. BOOTH     3,148,866
METHOD OF TREATING FLUE DUST
Filed July 23, 1963
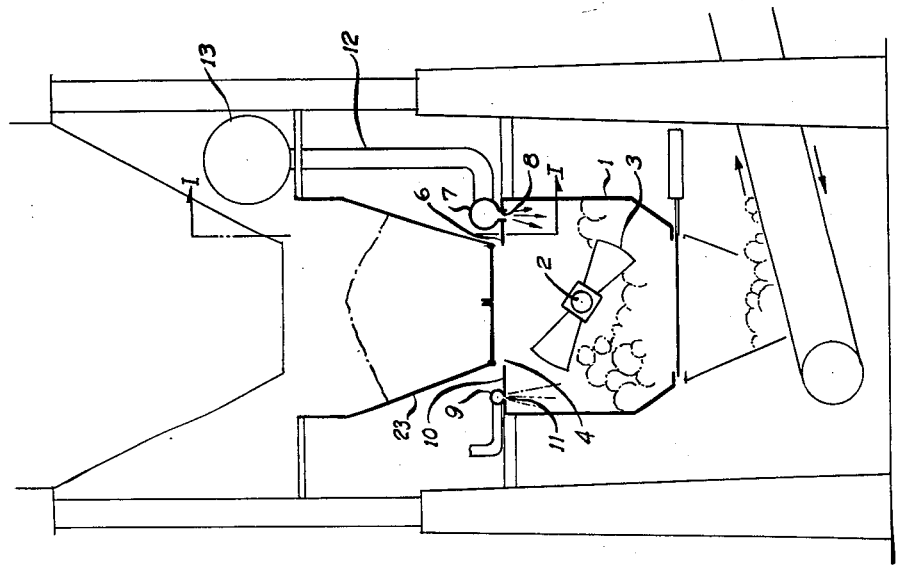
*Fig. II*
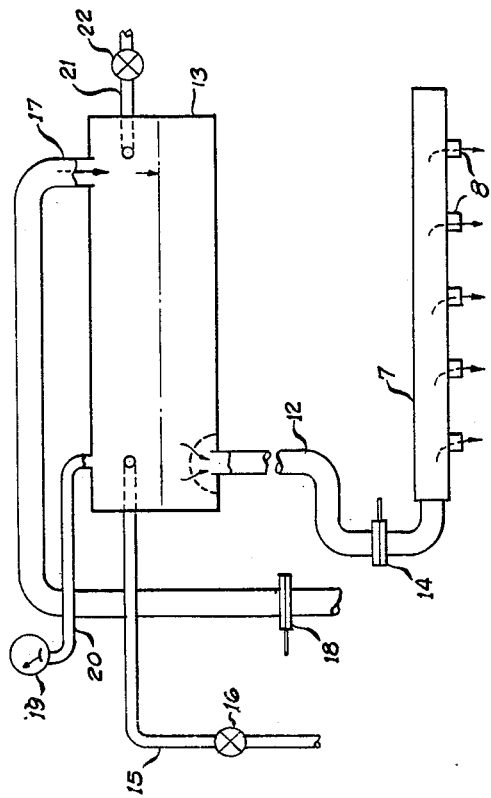
*Fig. I*
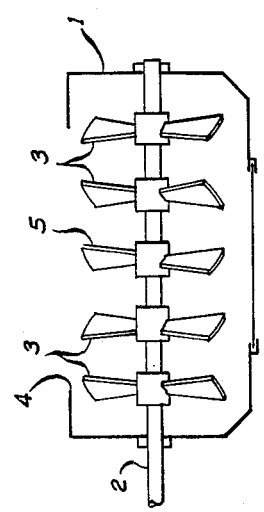
*Fig. III*
INVENTOR.
Charles H. Booth
BY William B. Jaspert
Attorney.

United States Patent Office
3,148,866
Patented Sept. 15, 1964

3,148,866
METHOD OF TREATING FLUE DUST
Charles H. Booth, 450 5th Ave., New Kensington, Pa.
Filed July 23, 1963, Ser. No. 297,063
4 Claims. (Cl. 259—149)

This invention relates to new and useful improvements in method of treating flue dust or other fines to render them useful for handling, as for example to form flue dust or fine ores into balls for charging into blast furnaces or the like, and the present application is a continuation-in-part of a former application serially numbered 218,733 filed August 22, 1962. In the former application, the flue dust or fines were charged into a pug mill in which it was maintained at a suitable temperature and a foam consisting of steam and bitumin was sprayed into the pug mill while the flue dust was subjected to a mixing action. When the mixture had become a flowable mass, it was discharged into a non-heated mixing device and formed into ball-like masses for charging into a blast furnace.

The present application deals with a method of treating flue dust in a manner to make it more susceptible to the formation of ball-like lumps of desirable size with less mixing action and thereby accomplish the balling effect in less time and with less equipment.

In accordance with the present invention, water is utilized to initially spray the flue dust before the steam and bitumin is added and after it has been mixed, water is again added to help cool and solidify the mass and to enhance the balling or combining tendency to form lumps in the mixed material for the purpose of forming larger balls which are useful in charging the dust into blast furnaces or the like.

The invention will become more apparent from a consideration of the accompanying drawings constituting a part hereof in which like reference characters designate like parts and in which:

FIGURE 1 is a view in side elevation diagrammatically illustrating a pug mill and steam tank for carrying out the method of treating the flue dust or other fines;

FIGURE 2 an end elevational view thereof; and,

FIGURE 3 is a diagrammatic view of the impeller shaft and blades of the pug mill.

In the drawings, the numeral 1 designates the housing of a pug mill having a centrally mounted shaft 2 with blades 3 some of which having their pitch disposed at opposite angles, as shown in FIGURE 3 of the drawing, so that when the material is charged through the central opening 4 of the housing 1, it will be impelled in both directions from the center blade designated 5. This makes for a thorough mixing of the material inside of the pug mill. Mounted above the cover portion 6 of the pug mill housing is a conduit 7 having nipples 8 constituting flow nozzles for steamed pitch or tar, the nipples being shown spaced along the length of the conduit 7 in FIGURE 1 of the drawing. Conduit 9 is mounted on another cover portion 10 of the pug mill housing 1 and is provided with perforations 11 for spraying water into the pug mill. As shown in FIGURE 1, the conduit 7 is connected by a line 12 to what may be designated a mixing tank 13, a gate valve 14 being provided to cut off the flow from tank 13 through the line 12 to the spray conduit 7.

Tank 13 is provided with a steam line 15 leading to a source of steam which is provided with a valve 16. Tank 13 is also provided with a line 17 leading to a source of fluid asphalt or tar such as coke tar, and is provided with a suitable valve 18 to control the flow of the tar through the line. A pressure gauge 19 is connected by pipe 20 to the tank 13 to indicate the steam pressure existing within the tank.

An air line 21 is provided at one end of the tank and is connected to a source of compressed air or air under pressure, the flow of which is controlled by a valve 22.

In FIGURE 2, a weigh hopper 23 is shown suspended above the pug mill 1 in line with the opening 4 and when a weighed amount of material is dumped from the weigh hopper into the pug mill 1, the shaft 2 is actuated by a suitable source of power such as a motor, not shown, to begin the mixing action.

The apparatus carries out the method of treating the dust in the following manner; proportions by weight, temperature and pressure being given as an example. 1500 pounds of flue dust is weighed in the hopper 23 and dropped through opening 4 into the pug mill 1 with the hopper in the position shown in FIGURE 2 of the drawing. 62 pounds of water is then metered into the mill to dampen the flue dust through the perforations 11 of the water spray pipe 9. This is done while the shaft 2 rotates and the blades agitate and mix the flue dust with the water and while it is mixing, 90 pounds of coke oven tar or asphalt is pumped into the steam tank 13 and the steam is turned on and held one minute after the steam pressure goes to about 80 pounds on the gauge 19.

The steam foams the tar or asphalt under pressure and increases its volume. The mixture is then released through the line 12 to the spray pipe 7 by opening valve 14 and by opening valve 22 in the air line, the air pressure forces the contents of tank 13 through the line 12 and delivers the same to the asphalt spray pipe 7 and nozzles 8 to the wet flue dust mixture in the ball mill 1. At the same time, another 62 pounds of water is metered from the water line 9 which cools the mix and aids in the formation of balls which, because of the water, are formed in rather large proportions. The final operation in the bar mill lasts approximately one minute with the shaft 2 operating at a speed of about 85 r.p.m. and the total mixing time from the charging of the flue dust in the bar mill 1 until it is discharged onto a conveyor belt is about 4½ minutes. Air may likewise be supplied during the last minute of the balling operation in the pug mill to aid in cooling the mixture.

While the above proportions of water, tar and steam pressure have been given for a 1500 pound charge, these proportions may be varied. For example, both the initial and final addition of water may vary from 10 to 20% by weight. The tar can vary in proportion to the flue dust charge from 3 to 8%, the 90 pounds of tar given above being 6% of the 1500 pounds flue dust charge. The steam pressure may vary from 65 to 85 pounds steam and the air cooling at the final step may be eliminated entirely, depending upon whether the finished product is to be transported or stored.

The tar mix charged into the tank 13 is at a temperature of about 225° F. and the flue dust is at a temperature of about 180° F., the resulting temperature of the mix being 165° F. Steam pipes or other heating means may be used in the pug mill. The temperature of the air delivered through the line 22 should be relatively high to avoid coagulation of the tar or asphalt material in the tank 13. The air temperature may be in the range from 190 to 400° F.

It is evident that the quantity of the materials given here may be varied more or less and very substantially so depending upon the size of the equipment used and the desired volume of material to be handled within a given time. However, the proportion of the weight of the flue dust or fines, the water, the tar mix and the pressure of the steam would be approximately the same although these too may be varied in proportion to one another because of the variation in the quantities of the materials being handled, the speed at which they are mixed or the size of the lumps or balls formed.

Although one embodiment of the invention has been herein illustrated and described, it will be evident to those skilled in the art that various modifications may be made in the details of construction without departing from the principles herein set forth.

I claim:

1. In the method of treating flue dust and the like to compact the same for handling or charging into blast furnaces and the like, the steps of charging the flue dust into a pug mill and mixing the same in the presence of a water spray and continuing the mixing action while conducting a foamed mixture of steam and bitumin into the pug mill to combine with the moistened flue dust mixture, continuing the mix while adding additional water spray to cool and solidify the mass and discharging the cooled mixture in the form of compact ball-like shapes.

2. The method of treating flue dust as set forth in claim 1 in which the flue dust charged into the pug mill in proportion to the water and bitumin is 1500 pounds flue dust, 62 pounds of water spray, 90 pounds of bitumin and steam at approximately 80 pounds gauge and a final spray of 62 pounds of additional water.

3. The method of treating flue dust as set forth in claim 1 in which the flue dust is charged into the pug mill at a temperature of about 180° F. and the bitumin steam mix at a temperature of about 225° F. and in which the air for forcing the bitumin out of the mixing tank into the pug mill is at a temperature of from 190 to 400° F.

4. The method of treating flue dust set forth in claim 1 in which the initial and final water added to the mix is from 3% to 6% by weight of the flue dust and the bitumin is from 3% to 8% by weight of the flue dust.

References Cited in the file of this patent
UNITED STATES PATENTS 1,750,264     Garrow _____ Mar. 11, 1930

FOREIGN PATENTS 891,731     Great Britain _____ Mar. 21, 1962